US007565627B2

(12) United States Patent
Brill et al.

(10) Patent No.: US 7,565,627 B2
(45) Date of Patent: Jul. 21, 2009

(54) QUERY GRAPHS INDICATING RELATED QUERIES

(75) Inventors: Eric D. Brill, Redmond, WA (US); Hugo Zaragoza, Cambridge (GB); Robert J. Ragno, Kirkland, WA (US); Silviu-Petru Cucerzan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 10/955,122

(22) Filed: Sep. 30, 2004

(65) Prior Publication Data

US 2006/0074870 A1 Apr. 6, 2006

(51) Int. Cl.
*G06F 3/00* (2006.01)

(52) U.S. Cl. .................. 715/854; 715/853; 715/848; 707/3

(58) Field of Classification Search ............ 707/1–206; 715/854, 853, 855, 968
See application file for complete search history.

(56) References Cited

U.S. PATENT DOCUMENTS

| | | | | | |
|---|---|---|---|---|---|
| 5,907,837 | A | * | 5/1999 | Ferrel et al. ............... | 707/3 |
| 6,216,134 | B1 | * | 4/2001 | Heckerman et al. ...... | 707/104.1 |
| 6,243,093 | B1 | * | 6/2001 | Czerwinski et al. ........ | 715/848 |
| 6,259,458 | B1 | * | 7/2001 | Theisen et al. ............. | 345/440 |
| 6,374,241 | B1 | * | 4/2002 | Lamburt et al. ............ | 707/6 |
| 6,393,415 | B1 | * | 5/2002 | Getchius et al. ............ | 707/2 |
| 6,438,579 | B1 | * | 8/2002 | Hosken ...................... | 709/203 |
| 6,519,592 | B1 | * | 2/2003 | Getchius et al. ............ | 707/6 |
| 6,628,313 | B1 | * | 9/2003 | Minakuchi et al. ......... | 715/853 |
| 6,643,640 | B1 | * | 11/2003 | Getchius et al. ............ | 707/3 |
| 6,732,088 | B1 | * | 5/2004 | Glance ...................... | 707/3 |
| 6,801,229 | B1 | * | 10/2004 | Tinkler ..................... | 715/853 |
| 6,868,525 | B1 | * | 3/2005 | Szabo ....................... | 715/738 |
| 6,918,096 | B2 | * | 7/2005 | Hugh ........................ | 715/854 |
| 6,931,604 | B2 | * | 8/2005 | Lane ......................... | 715/853 |
| 7,062,752 | B2 | * | 6/2006 | Simpson et al. ............ | 717/120 |
| 7,158,966 | B2 | * | 1/2007 | Brill et al. .................. | 707/3 |
| 7,181,438 | B1 | * | 2/2007 | Szabo ........................ | 707/2 |
| 7,200,820 | B1 | * | 4/2007 | Stephens ................... | 715/838 |
| 7,296,021 | B2 | * | 11/2007 | Malkin et al. .............. | 707/7 |
| 7,334,195 | B2 | * | 2/2008 | Gemmell et al. .......... | 715/841 |

(Continued)

OTHER PUBLICATIONS

Partial European Search Report mailed on Jan. 23, 2006, for European Patent Application No. EP05108342, 4 pages.

(Continued)

*Primary Examiner*—Sy D Luu
(74) *Attorney, Agent, or Firm*—Lee & Hayes, PLLC

(57) ABSTRACT

The present invention leverages query-related information based on a query and/or a search intention to provide a systematic means to facilitate a user in locating desired information despite lacking exact search parameters. This allows users to find information without first formulating an optimum search query. The query graph provides a navigable, graphical notion of the query-related information via nodes representative of the query-related information and edges representative of the associations between the information. In one instance of the present invention, the query graph is derived from an information source such as a query log, a query list, and/or a search engine and the like. Additional instances of the present invention utilize visual and/or audible indicators employed with the query graph to facilitate in relaying the query-related information to the user, including, but not limited to, overlays, icons, colors, and dimensional variances and the like.

46 Claims, 9 Drawing Sheets

U.S. PATENT DOCUMENTS

| | | | |
|---|---|---|---|
| 2002/0105552 A1* | 8/2002 | Lane | 345/853 |
| 2002/0169737 A1* | 11/2002 | Armstrong et al. | 706/59 |
| 2005/0114802 A1* | 5/2005 | Beringer et al. | 715/968 |
| 2005/0171760 A1* | 8/2005 | Tinkler | 704/10 |
| 2006/0101347 A1* | 5/2006 | Runov et al. | 715/764 |

OTHER PUBLICATIONS

Natalie S. Glance, "Community Search Assistant", 2001 International Conference on Intelligent User Interfaces, IUI 2001, Sante Fe, NM, Jan. 14-17, 2001, Annual International Conference on Intelligent User Interfaces, New York, NY.

Extended European Search Report mailed on Mar. 28, 2006, for European Patent Application No. EP05108342, 13 pages.

Natalie S. Glance, "Community Search Assistant", 2001 International Conference on Intelligent User Interfaces, IUI 2001, Sante Fe, NM, Jan. 14-17, 2001, Annual International Conference on Intelligent User Interfaces, New York. NY, ACM, US, 2001, pp. 91-96.

Scott Marshall, "Methods and Tools for the Visualization and Navigation of Graphs", PHD Thesis Universite Bordeaux, 2001, pp. 41 and 43.

Thomas Bladh, et al, "Extending Tree-Maps to Three Dimensions : A Comparative Study", Computer Human Interaction : 6th Asia Pacific Conference, APCHI 2004, Jun. 29, 2004, pp. 50-59, vol. 3101.

Schneiderman B, "Designing the User Interface: Strategies for Effective Human-Computer Interaction", Designing the User Interface, Strategies for Effective Human Computer Interaction, Reading, Addison Wesley, US, 1992, pp. 519-521, 526.

John Lamping, et al., "The Hyperbolic Browser: A Focus+Context Technique for Visualizing Large Hierarchies", Journal of Visual Languages and Computing, London, GB, Mar. 1996, pp. 33-55, vol. 7, No. 1.

Tamara Munzner, "Drawing Large Graphs with H3viewer and Site Manager", Graph Drawing. Symposium on Graph Drawing. Proceedings, 1998, pp. 384-393.

Bruno M. Fonseca, et al., "Using Association Rules to Discover Search Engines Related Queries", Web Congress, 2003, Proceedings. First Latin American, Nov. 10-12, 2003, Piscataway, NJ, USA, IEEE Nov. 10, 2003, pp. 66-71.

Josep M. Pujol, et al., "Porqpine: A Peer-to-Peer Search Engine", Technical report LSI-03-6-R, 2003.

Paul Resnick, et al., "Grouplens: An Open Architecture for Collaborative Filtering of Netnews", Proceedings of Conference on Computer-Supported Cooperative Work, Oct. 7-10, 1990, Los Angeles, New York, NY, US, Oct. 22, 1994, pp. 175-186.

Michael B. Twidale, et al., "Browsing is a Collaborative Process", Information Processing & Management, Elsevier, Barking, GB, Nov. 1997, pp. 761-783, vol. 33, No. 6.

* cited by examiner

QUERY GRAPHS INDICATING RELATED QUERIES

TECHNICAL FIELD

The present invention relates generally to data searching, and more particularly to systems and methods for automatically deriving a query graph from a query and/or search intention.

BACKGROUND OF THE INVENTION

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Typically, the information available via web sites and servers is accessed via a web browser executing on a web client (e.g., a computer). For example, a web user can deploy a web browser and access a web site by entering the web site Uniform Resource Locator (URL) (e.g., a web address and/or an Internet address) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and a suffix (e.g., com, org, net, gov and edu) that identifies the type of organization.

Alternatively, the user can enter keywords into a general search engine, which will search the entirety of the World Wide Web or other collection of sites (e.g., intranet) and return sites that it determines to be related to the keywords. Often, however, the general search engine will return a substantial number of sites that are wholly unrelated to the particular interests of the user. For example, if the user searched using the keyword "virus," rather than obtaining information related only to computer viruses he would receive information relating to biological viruses as well as computer viruses. The user can thereafter scroll through a plurality of returned sites and attempt to determine if they are related to user interests. Scrolling through returned results can be extremely time consuming and frustrating to the user, as general search engines can return a substantial number of sites when performing a search. The user can attempt to narrow the search via utilizing a combination of Boolean operators, but it can be difficult to construct an appropriate Boolean search that will result in a return of sites containing only relevant information.

A search engine searches the contents of web sites and servers for keywords, and returns a list of links to web sites and servers where the keywords are found. Basically, the search engine incorporates a web "crawler" (aka, a "spider" or a "robot") that retrieves as many documents as possible as their associated URL. This information is then stored such that an indexer can manipulate the retrieved data. The indexer reads the documents, and creates a prioritized index based on the keywords contained in each document and other attributes of the document. (Note that all words may be considered as keywords). Respective search engines generally employ a proprietary algorithm to create indices such that meaningful results are returned for a query.

However, despite the vast improvements in searching afforded by technology such as search engines, users are often too overwhelmed with search results to actually find what they are searching for. Additionally, a typical search engine does little to facilitate a user who is not sure what they are trying to find. Thus, they may enter various search queries just to see if one of them returns results of interest. In either case, the user typically comes away unsatisfied and without the information that they were seeking. If one considers that a great deal of information is utilized for business transactions, such as matching products to potential buyers, providing information to an appropriate user is extremely valuable. Users seeking information need to be able to find information quickly and easily whether or not they can second guess what search query string would trigger a search engine to find what they are looking for.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data searching, and more particularly to systems and methods for automatically deriving a query graph from a query and/or search intention. Query-related information based on the query and/or search intention is leveraged to provide a systematic means to facilitate a user in locating desired information despite lacking exact search parameters. This allows users to find information without first formulating an optimum search query. The query graph provides a navigable, graphical notion of the query-related information via nodes representative of the query-related information and edges representative of the associations between the information. In one instance of the present invention, the query graph is derived from an information source such as a query log, a query list, and/or a search engine and the like. Additional instances of the present invention utilize visual and/or audible indicators employed with the query graph to facilitate in relaying the query-related information to the user, including, but not limited to, overlays, icons, colors, and dimensional variances and the like. Thus, the present invention provides an efficient and navigable method for facilitating information searching without requiring a user to enter an optimized search parameter, easily permitting improvements of suboptimal search queries.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may

DETAILED DESCRIPTION OF THE INVENTION

Figure 1:
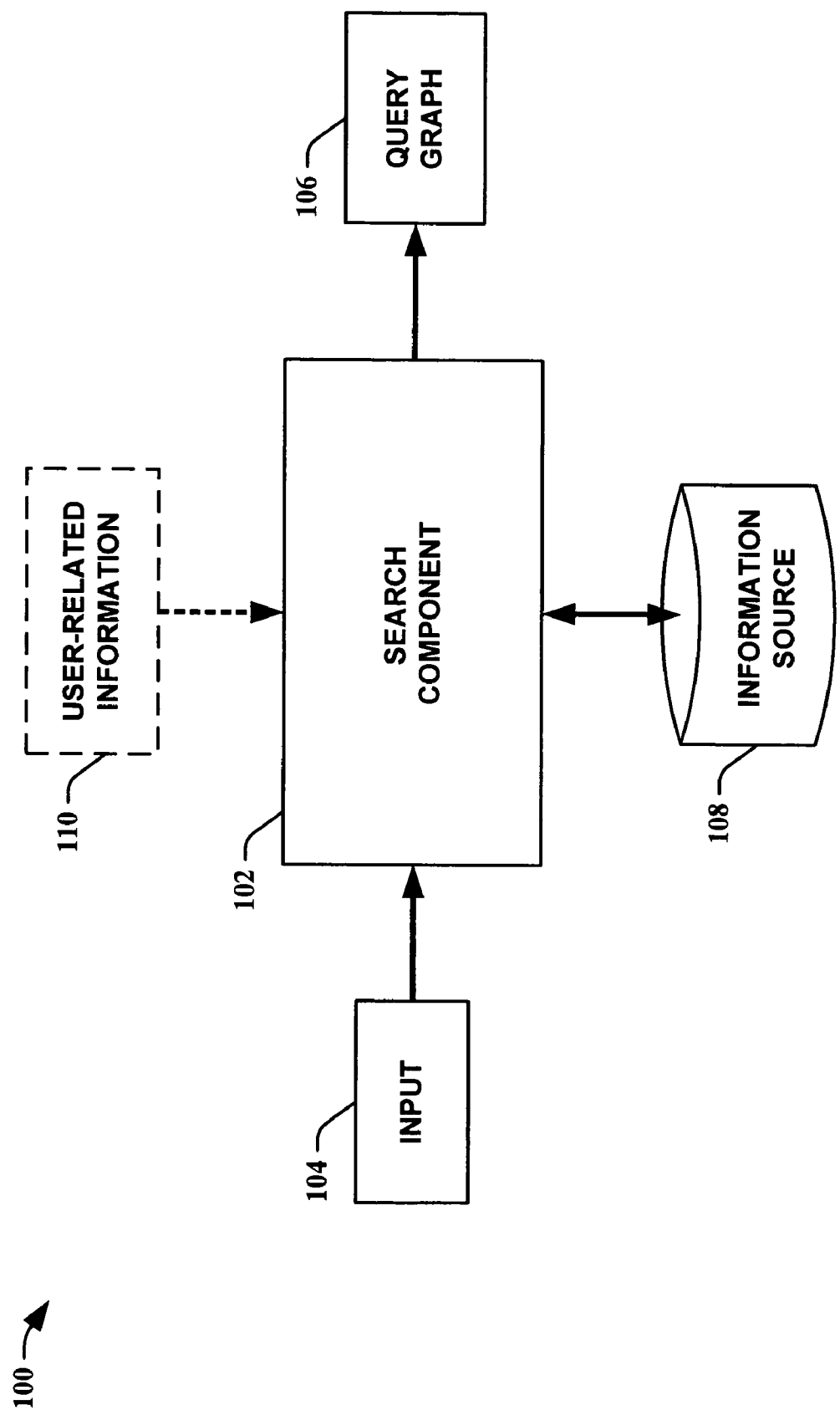
FIG. 1 is a block diagram of an information search system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

One major challenge for a user of a search engine is formulating a query that will return the desired results. When a user tries a suboptimal query, search engines do not do a very good job at facilitating the user to more effectively express their intent. The present invention provides systems and methods that significantly improve the ability of a user to search large information collections, such as, for example, the World Wide Web, an intranet, and a data store and the like, helping them to find both specific things they are looking for as well as assisting in the process of browsing and discovering. The present invention provides a navigable, automatically derived query graph to a user, allowing the user to explore a large information collection through queries and improve the results of an imperfect search. Other instances of the present invention also provide standard search results (e.g., hyperlinks to documents and/or web pages and the like) for a query with the query graph. A query graph is a graph of queries and their relations. It is comprised of nodes that represent query-related information and edges, if shown, that represent associations between the query-related information. The query-related information can also be organized in various manners, described infra, to additionally assist the user with finding their appropriate information.

In FIG. 1, a block diagram of an information search system 100 in accordance with an aspect of the present invention is shown. The information search system 100 is comprised of a search component 102 that receives an input 104 and automatically derives a query graph 106. The search component 102 interfaces with an information source 108 to provide related information to the input 104. Search component 102 can also interface with optional user-related information 110 to refine the query graph 106 based on user-related data. The present invention can be utilized to provide query graphs for navigating any type of media and not just to navigate through the Internet/World Wide Web.

For example, the present invention can be employed via an intranet system to allow users within an enterprise to find relevant data. If a user is trying to find a particular product of a company but does not know its name, they can enter a general "products" query and receive a query graph constructed around that query that includes, for example, queries related to the products query. This could include a grouping of 'electrical product' queries and a grouping of 'mechanical product' queries and the like. Within the electrical product query grouping could be queries such as 'electric razors,' 'hot shaving cream dispensers,' and 'lighted mirrors' and the like. The mechanical query grouping could include 'straight razors,' 'shaving brushes,' and 'moustache brush' and the like. The user might have originally desired to find information about shavers without knowing if they were looking for an electric razor or straight razor. The user might not have even realized that the company had multiple shavers. The query graph allows the user to select a single query and/or multiple queries and/or a node that is an aggregate of a plurality of queries. Thus, the user can select 'electric razors,' and the present invention can derive an additional query graph centered around the selected query. The query graph for 'electric razors' could include further related queries such as, for example, 'foil type razors' and 'rotary type razors' that appear after selecting the aggregated 'electric razors' query graph node.

In other instances of the present invention, links, such as hyperlinks, are provided with the query graph as well. This allows the user to go directly to, for example, a document and/or a web page and the like related to that query. Still other instances of the present invention permit a user to indicate via selecting a node of the query graph to immediately display a list of query related documents and/or web pages and the like for that particular node. Thus, the present invention provides an easily navigable query graph that allows users to explore information without formulating an exact initial search query. This permits information extraction without the difficulty of preconceiving of how a typical search engine would approach the problem of finding the data that the user desires.

Figure 2:
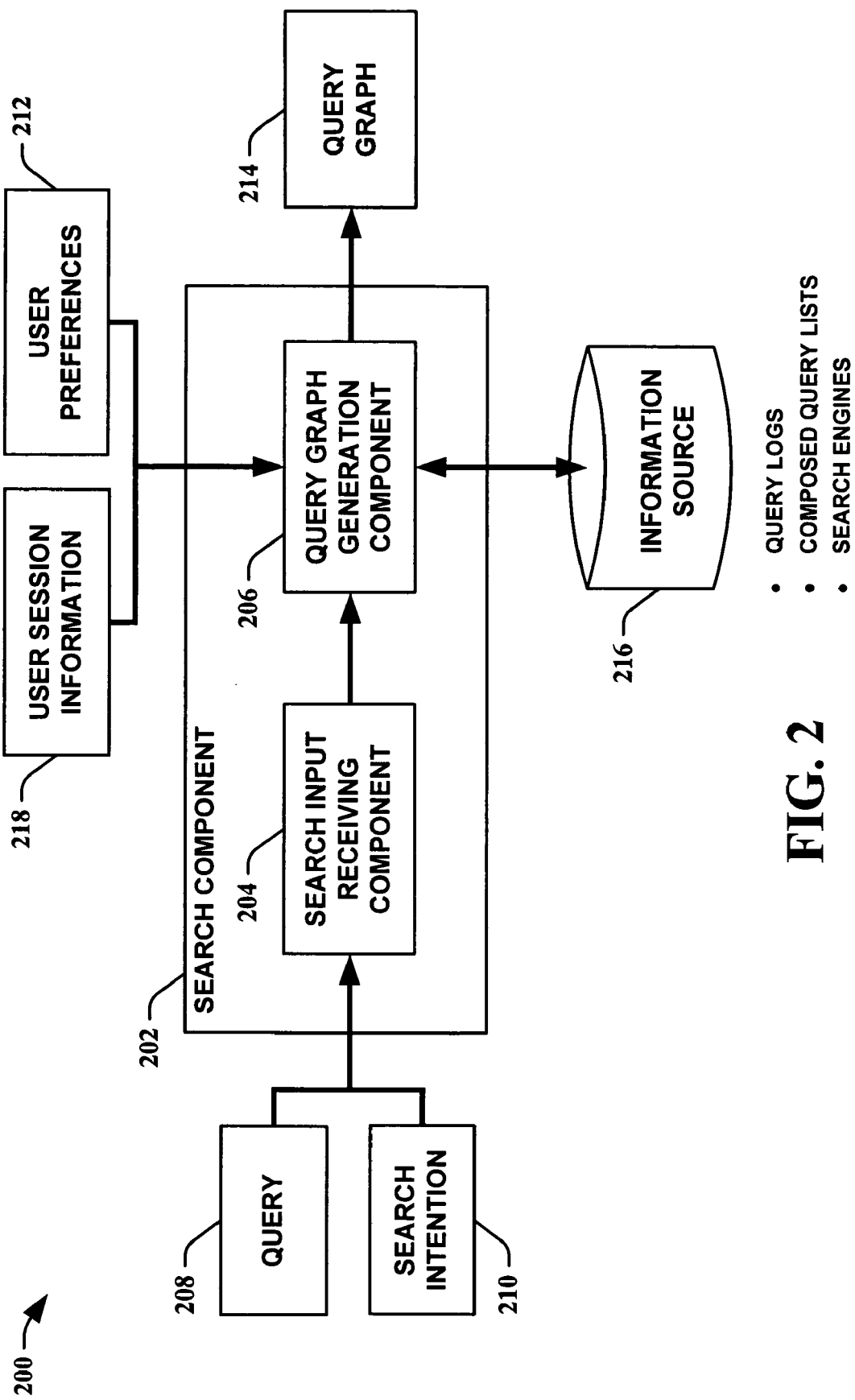
FIG. 2 is another block diagram of an information search system in accordance with an aspect of the present invention.

Referring to FIG. 2, another block diagram of an information search system 200 in accordance with an aspect of the present invention is depicted. The information search system 200 is comprised of a search component 202. The search component 202 is comprised of a search input receiving component 204 and a query graph generation component 206. The search input receiving component 204 receives inputs such as, for example, query input 208 and/or search intention input 210. The present invention can also be associated with a search intention that has been expressed previously. It does not require that a new query be received in order to derive a query graph. The inputs 208, 210 are then sent to the query graph generation component 206. The query graph generation component 206 interfaces with an information source 216 to facilitate in automatically deriving a query graph 214. The information source 216 can include, but is not limited to, query logs, composed query lists, and search engines and the like. The information source 216 provides data that is utilized to formulate query-related information for the query graph 214. The query graph generation component 206 also interfaces with user-related information such as, for example, user session information 218 and/or user preferences 212. The user preferences 212 can include, but is not limited to, directly input user preferences such as preferences set by a user and/or indirectly input user preferences such as preferences derived by a system and the like. The preferences can also be associated with a group of users. The user session information 218 can include, but is not limited to, such information as prior user queries, user querying trends, and/or last user query and the like. This type of information facilitates the query graph generation component to exclude any irrelevant data and/or enhance the query graph to improve a user's satisfaction and/or query graph readability and the like. The query graph generation component 206 can also utilize graphical and/or text-based user interface data to customize the generation and appearance of the query graph 214. This can include, but is not limited to, constructing a query graph that comprises a listing of at least one query. In this instance, the listing includes node(s) of a query graph with or without depicting edges of the query graph.

Figure 3:
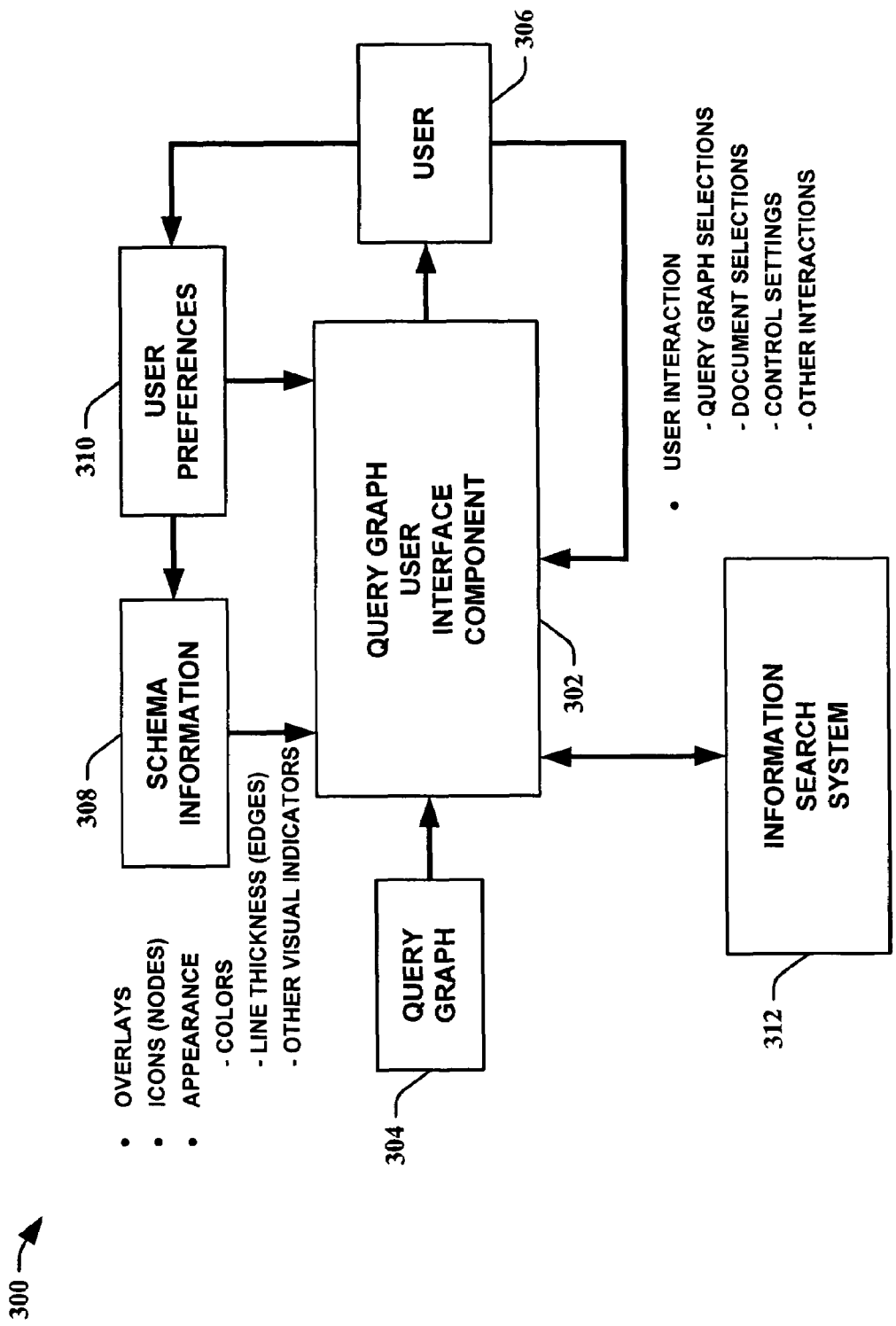
FIG. 3 is a block diagram of a graphical user interface system for an information search system in accordance with an aspect of the present invention.

Turning to FIG. 3, a block diagram of a graphical user interface system 300 for an information search system in accordance with an aspect of the present invention is illustrated. The graphical user interface system 300 is comprised of a query graph user interface component 302 that receives a query graph input 304. The interface component 302 provides sensory and/or informational enhancements to the query graph input 304 including, but not limited to, visual and/or audible enhancements. This enhanced query graph is then conveyed to a user 306. One skilled in the art will appreciate that the query graph can also be directly conveyed to a user without any 'enhancements.' Because the query graph is navigable, the query graph user interface component 302 interacts with the user 306 to permit alterations of the query graph input 304 and additionally interfaces with a search system 312 to derive additional query graphs when required. The query graph user interface component 302 can also utilize schema information 308 and/or user preferences 310 as well to facilitate in enhancing the query graph input 304. The schema information b 308 can include, but is not limited to, overlays for the query graph, icons for depicting the nodes of the query graph, and appearance information such as, for example, colors, line thicknesses of the edges of the query graph, and other visual and/or audible indicators and the like.

The query graph can also be displayed to a user as a listing of recommended and/or related queries.

The query graph user interface component 302 can also employ dimensional attributes to allow additional dimensions to be utilized in relaying information to the user 306. This can include, but is not limited to, employing a third dimension to indicate time such as the age of query-related information depicted by placement of the nodes of a query graph. For example, older nodes can appear further in the background than more current nodes. Overlays can also be employed over the query graph to facilitate in relaying the information to different types of users. For example, a children's themed overlay can be utilized such that a query graph appears as a house with windows as nodes and/or a tree with leaves as nodes and branches as edges and the like. The nodes can also be represented utilizing graphical images such as icons and the like to facilitate in easier dissemination of the underlying nodal information. This can, for example, aid illiterate users in navigating through information without requiring them to read any text and yet still locate the information they desire. The user preferences 310 can include both direct and/or indirect/derived user preferences. Thus, environmental and/or situational awareness information and the like can be utilized by the query graph user interface 302. The user can also interact directly with the query graph user interface component 302. These interactions can include, but are not limited to, selecting additional query graphs, selecting search results such as documents and the like, setting control parameters, and other interactions as well.

One skilled in the art will appreciate that functions of a graphical user interface system can be incorporated directly into an information search system. And, likewise, functions of an information search system can be incorporated into a graphical user interface.

In order to better appreciate the present invention, it is helpful to understand the problems faced by users when they seek information. One substantial issue is that a user generally must determine beforehand what query will return the desired results from a particular search engine. This issue is compounded when one considers that search engines tend to utilize different search algorithms. This requires the user to second-guess based on which search engine is being utilized. Thus, when a user tries a suboptimal query, search engines respond poorly at facilitating the user to more effectively express their intent. To the contrary, the present invention provides systems and methods that significantly improve the ability of users to search large document collections, helping both to find specific information a user is looking for as well as assisting in exploring information. The present invention not only allows discovery of information through search queries in a navigable, automatically derived query graph, but it can also provide search results associated with those search queries as well. This is extremely beneficial because information searching is of paramount importance to enterprises, especially those that specialize in providing searching mechanisms. The search industry is a multi-billion dollar market for internet searching alone. As the value of a user's time increases, improving information retrieval becomes an ever increasing priority. The present invention improves information searching in these contexts as well as others.

Generally speaking, there are different types of information needs that a user can have when querying a search engine. In one case, a user might have a very specific intent (e.g., looking for a low-fat chocolate chip cookie recipe). To satisfy their intent, the user issues a query to the search engine and gets back a list of documents. If these documents fail to satisfy the user's intent, the user then has to try a different query, navigate hyperlinks on the web, or give up. In another case, a user has a less specific intent (e.g., looking for a good dessert recipe). To satisfy their intent, the user has to find a good web page from which to browse, or the user can repeatedly try different queries (e.g., "brownies," "pudding," "quick desserts"...) in the hope of satisfying their search intent. In yet another case, a user might have no specific intent other than just to browse, for example, the Internet to spend some time. Again, the user can use a search engine for this by trying a sequence of queries or can browse by following hyperlinks.

Figure 4:
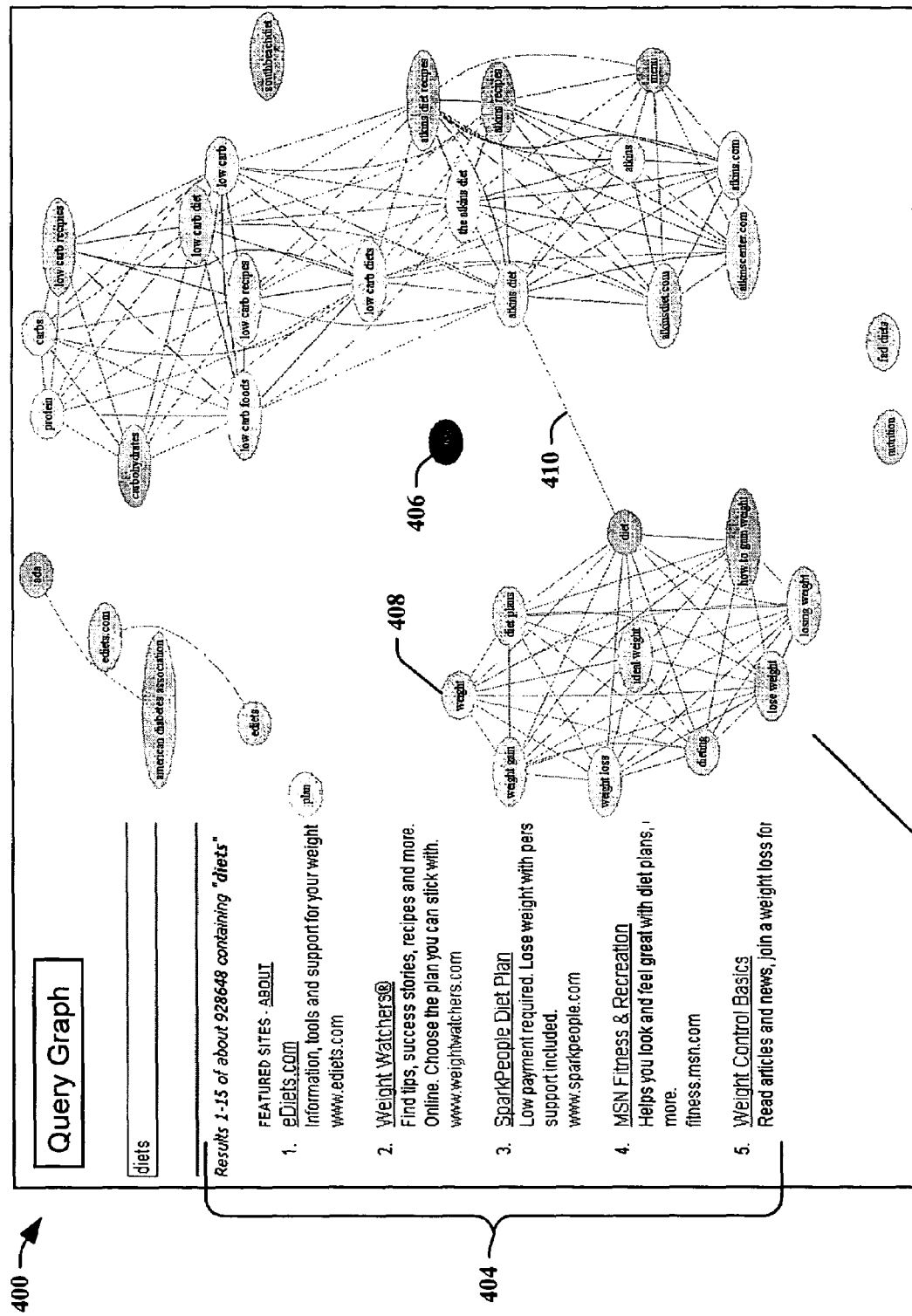
FIG. 4 is a screenshot of an instance of a query graph in accordance with an aspect of the present invention.

The present invention, however, provides a user with new systems and methods for accessing and exploring information such as documents and/or Web pages and the like that utilize a navigable, automatically derived query graph. A query graph puts a user's query in the context of a graph containing other related queries, clustered by, for example, similarity. The user can then navigate the query graph (that is, choose other queries in the graph), in addition to the returned search results for the query. In FIG. 4, a screenshot 400 of an instance of a query graph 402 in accordance with an aspect of the present invention is shown. The screenshot 400 includes the query graph 402 as well as an optional query results section 404. In this example, a "diets" input to an information search system is depicted in the center of the query graph 402 as a "diets" node 406. Additional nodes 408 of the query graph 402 represent query-related information derived from the input "diets" node 406. Edges 410 relay association information between the nodes 408 to the user. The edges 410 can be varied in thickness, represented by a string of geometric shapes to form a line, colored, and/or dashed and the like to indicate various strengths of the associations. The nodes 408 can also be grouped/clustered to indicate groupings that are more related/similar than other query-related nodes. The optional query results section 404 can be, for example, a listing of textual and/or graphical hyperlinks to documents and/or web pages. In addition, if a user is visiting, for example, a web page, the present invention can offer an alternative method for browsing the Web. Instead of following hyperlinks from the page a user is on, the user can view a query graph based on queries relevant to the visited page, and can then navigate the Web by choosing other queries in the graph related to the document in different ways.

As an example, one instance of the present invention is implemented as follows utilizing the infra definitions:

Given a specific search query q, let Q=related_queries(q) be the set of queries that are related to q.

Given two queries q1 and q2, let similarity(q1, q2) be a measure of the similarity of q1 and q2.

Given a query q' and a set of queries Q, let similarity(q',Q) be a measure of the similarity of q' to Q. (Otherwise Q and q are related by first line . . . ).

Given a query q' and a set of queries Q, let novelty(q',Q) be a measure of the novelty of q' given the set Q. (Otherwise Q and q are related by first line . . . ).

Given a query q, let quality(q) be a measure of the quality of q.

Given a query q, let popularity(q) be a measure of the popularity of q.

To build an instance of a query graph centered on query q:

```
Let Q = related_queries (q)
Let DISPLAY_SET = {q}
While (stopping criteria not met)
{
```

-continued

```
    For each q' in Q compute query_quality(q',q) =
f(similarity(q', q),
        similarity(q',DISPLAY_SET),novelty(q',DISPLAY_SET),
quality(q'),
        popularity(q'))
    Pick the q" that maximizes query_quality(q',q) from all q'
in Q.
        Q = Q - q"
        DISPLAY_SET = DISPLAY_SET + q"
}
For each q' in DISPLAY_SET
    For each q" in DISPLAY_SET
        Compute similarity(q', q")
Build the query graph where the original query q is in the
center, and queries are placed such that the distance between two
queries q' and q" in the graph is proportional to their similarity (q', q").
```

This algorithm is a 'greedy' version of a more general algorithm (choosing p out of a set P at once, instead of one at a time).

where the variables are determined by:

related_queries(q). This can be determined a number of ways, including, for example, taking the set of queries that users issue after they issue the query q, taking the set of queries users issue within a certain time of issuing q. Another way is to take the set of queries for which a search engine returns at least one document in the top "N" return set that is also in the top N return set for q.

similarity(q,q'). There are many ways this can be measured. For example, take the top 100 return documents from a search engine for each query and measure the similarity of those document sets (e.g., the cosine distance of the word probabilities in the two sets). Or, this could be based on the related query sets for q and q'. Or on linguistics properties of q and q'.

similarity(q, Q). This can be, for example, the average similarity of q and q', averaged over all q' in Q.

novelty(q, Q). In some situations, it is of little value to show the user, for example, 10 different queries, all of which return essentially the same set of documents in the search engine. Novelty can be defined, for example, as the percentage of documents in the top N search return set for q that do not appear in the top N search return set for any queries in Q. One skilled in the art will appreciate that other definitions of novelty are employable within the scope of the present invention.

quality(q). In some situations, it is also of little value to show a user a query, if the search engine returns all bad results for that query. The quality of a query can, for example, be estimated by measuring the percentage of time users who issue that query click on at least one result displayed by the search engine. Or the search engine may provide some information that can be used as an estimate of the quality of a search-result for a particular query.

popularity(q). Empirically, it can be shown that the more frequent queries are typically of greater value to a user than infrequent queries. Popularity can be computed, for example, as the number of times (e.g., say over a month) that the query was issued to the search engine.

Additionally, other instances of the present invention can provide enhanced features. For example, a query graph can be personalized for a particular user by biasing the results based on that user. Search engines typically log query and click through information for each user. When a user uses the query graph, the present invention can determine similar users to that user (e.g., by similarity of past queries and/or clicks/selections, and/or by profile information if present) and can restrict computation of quality(q) and popularity(q) to the queries and clicks/selections issued by similar users. Query graphs can also be personalized to a particular query session. E.g., if a user queries "telescope" and then "Saturn," the present invention can display a different query graph for "Saturn" than for a user who first queries "GM cars" and then "Saturn." One way to do this is to compute similarity of a related query, not just to the query the user just issued, but also to the previous query or queries the user issued. Thus, the present invention provides a very flexible and easily tailored means to provide information to a user without requiring optimal search queries. Query graphs can also be personalized to a particular geographical location. For example the query 'Baseball' may be expanded into "Lakers Tickets" in one geographical location and "Pistons Tickets" in another.

Figure 5:
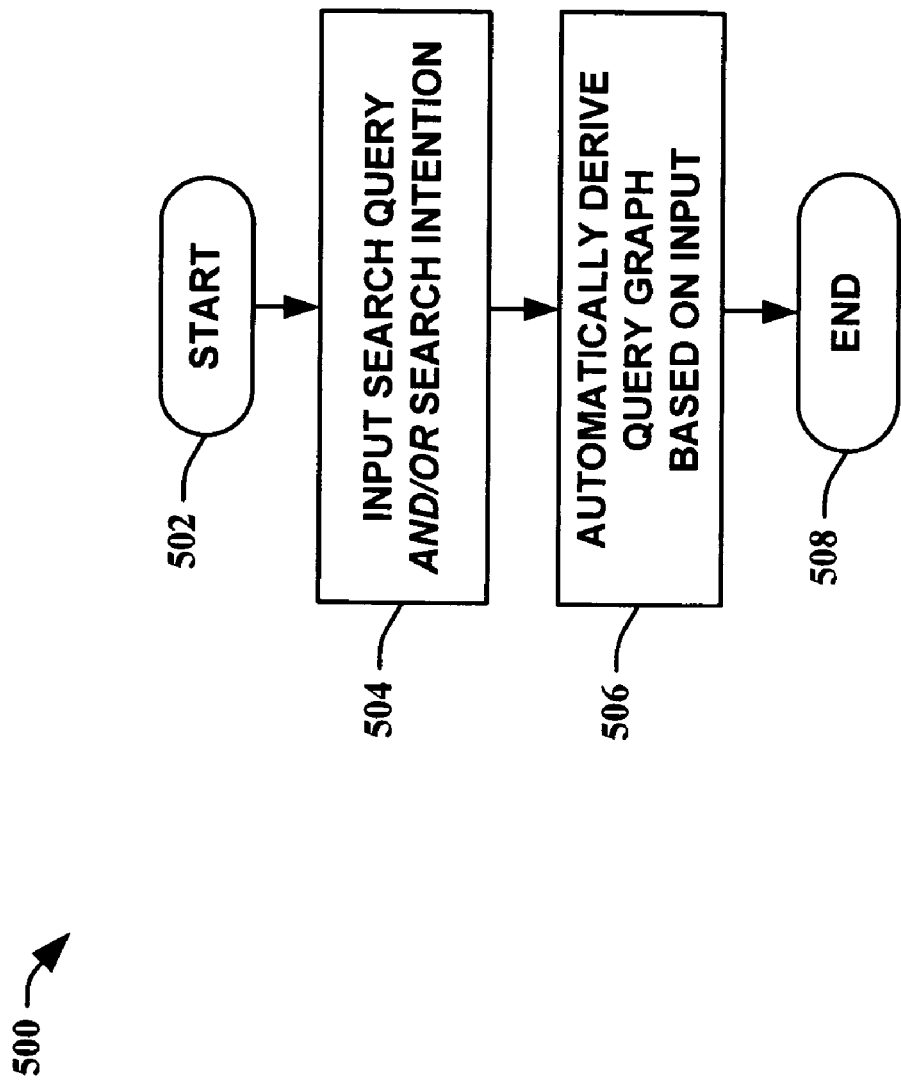
FIG. 5 is a flow diagram of a method of facilitating information searching in accordance with an aspect of the present invention.
Figure 6:
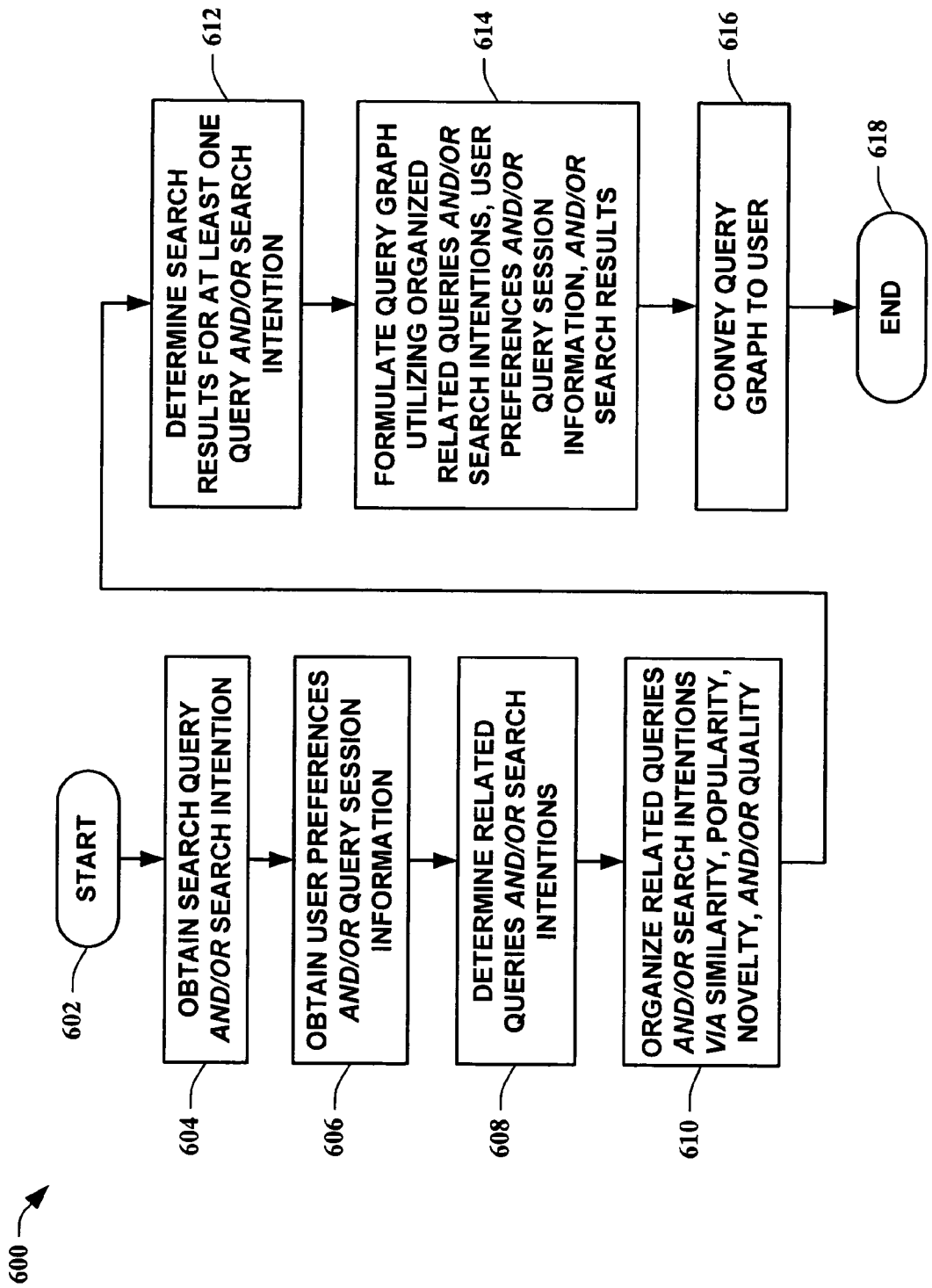
FIG. 6 is another flow diagram of a method of facilitating information searching in accordance with an aspect of the present invention.
Figure 7:
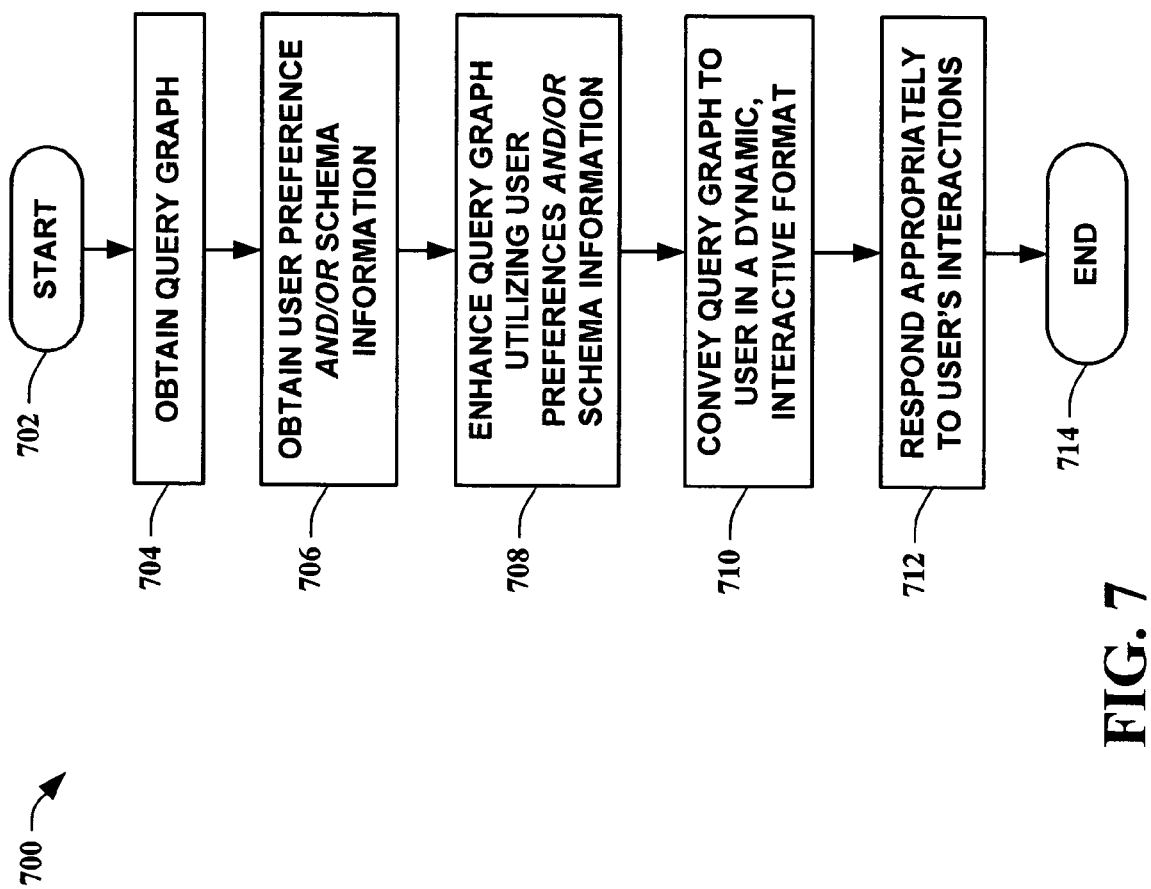
FIG. 7 is a flow diagram of a method for providing an interactive graphical user interface for facilitating information searching in accordance with an aspect of the present invention.

In view of the exemplary systems shown and described above, methodologies that may be implemented in accordance with the present invention will be better appreciated with reference to the flow charts of FIGS. 5-7. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 5, a flow diagram of a method 500 of facilitating information searching in accordance with an aspect of the present invention is shown. The method 500 starts 502 by inputting a search query and/or search intention 504. The search query and/or search intention can be obtained from a user and/or from a system that provides interaction with the present invention. A query graph is then automatically derived based on the input 506, ending the flow. Thus, a system employing the present invention can utilize, for example, environmental parameters and/or situational awareness to initiate a query graph. For example, an employee of a flower retailer could be shown a query graph based on 'currently available seasonal flowers' when the employee arrives first thing in the morning. The employee can then navigate the query graph further to find different species of flowers to order. Thus, they can accomplish this without first determining what species of flowers to search for.

Referring to FIG. 6, another flow diagram of a method 600 of facilitating information searching in accordance with an aspect of the present invention is depicted. The method 600 starts 602 by obtaining a search query and/or search intention 604. These inputs can be user supplied and/or system supplied. That is, it is not necessary for a user to supply a query and/or search intention to initiate the construction of a query graph. A query graph can be initiated by a system and/or user interface. User preferences and/or query session information is then obtained 606. The user preferences can include directly inputted user preferences and/or derived user preferences. The direct user preferences can include exclusionary queries and/or search intentions. Thus, the present invention can eliminate unwanted search information. The derived user preferences can be obtained from environmental factors and/or situational awareness factors and the like. Thus, time-of-day, activity of the user (e.g., on the telephone, computing, and talking with others in office and the like), and/or general overall purpose of a search and the like can be employed by the present invention to facilitate in constructing a query graph.

The present invention can also employ exclusionary queries and/or search intentions that have been derived from indirect preferences. Thus, if a user is situated in an automotive environment, a search query for a name associated with a make of a car will not yield search information related to common every day usage of that query term. (For example, "Saturn" returns only auto related information rather than information about the planet Saturn). Query session information such as, for example, prior queries can be utilized as well. Thus, for example, if 'planets' was a prior search query, the present invention can provide information about the planet Saturn and exclude automotive information and the like.

The inputted query and/or search intention is then utilized to determine related queries and/or search intentions 608. The related queries and/or search intentions are then organized via similarity, popularity, novelty, and/or quality and the like 610. Methods for determining these aspects have been elaborated on supra. In some instances of the present invention, search results for at least one query and/or search intention are determined 612. The query and/or search intention can be the inputted query and/or search intention, or it can also be the related query and/or search intention. Thus, the present invention can provide search results for an initial query and/or search intention and/or search results for related queries and/or search intentions. The present invention can also dynamically provide search results in response to user interactions such as selecting via hovering, clicking, visual interactions, and/or audible interactions and the like. The query graph is then formulated utilizing the organized related queries and/or search intentions, user preferences and/or query session information, and/or search results 614. In one instance of the present invention, the query graph is comprised of a listing of at least one query. This provides a user with a text-based query graph instead of a graphic-based query graph. Other instances of the present invention include text-and/or graphic-based query graphs.

In addition to those preferences described supra, the present invention can also incorporate limitations when formulating the query graph such as most frequented information, top N information list, and/or other limitations to reduce redundant and low value information. The nodes of the query graph can represent a single query and/or search intention and/or a plurality of query and/or search intentions such as with an aggregate node. The query graph is then conveyed to the user 616, ending the flow 618. The query graph itself is comprised of nodes that represent the related search queries and/or search intentions and of edges that represent relations between search queries and/or search intentions. It is not necessary with the present invention to display all nodes and/or any edges to convey query information to a user. One skilled in the art will appreciate that not all of the above steps are necessary to practice the present invention.

Turning to FIG. 7, a flow diagram of a method 700 for providing an interactive graphical user interface for facilitating information searching in accordance with an aspect of the present invention is illustrated. The method 700 starts 702 by obtaining a query graph 704. The query graph can be automatically derived as described supra. User preference and/or schema information is then obtained 706. This information can include, but is not limited to appearance information such as, for example, colors, line thickness of edges, line consistency of edges, and other visual indicators; use of graphical images such as, for example, icons for nodes of the query graph; and/or overlays and the like. By incorporating overlays and/or icons, the present invention provides a flexible interface that can be adjusted based on user preferences such as, for example, whether the user is a child or adult. Thus, for example, a children's scheme can be employed based upon a user preference, whether direct or derived. This enhances the conveying of information to the user, providing a more efficient and satisfying experience.

The query graph is then enhanced utilizing the user preferences and/or schema information 708. This can include, but is not limited to, color coding and/or varying thicknesses of edge lines to indicate the strengths of relations between nodes of the query graph, using graphical images for the nodes in place of or with text, and employing an overlay and the like. One skilled in the art will appreciate that the present invention affords great flexibility in conveying information and that other means to enhance the query graph that are not listed are within the scope of the present invention. The enhanced query graph is then conveyed to the user in a dynamic, interactive format 710. The conveyance can be via a visual means such as, for example, a monitor and/or an audible means such as, for example, via a speaker. Visual conveyance can be assisted by audible conveyance as well. Although a purely audible conveyance is not typical, the present invention can be employed such that rhyming and/or easily learned phrasing is employed to convey the information. A user querying 'bones of the body' can be provided with an audible conveyance such as "the knee bone is connected to the thigh bone." The user can then interact to indicate that they are interested in continuing 'thigh bone' queries. Thus, user's interactions are appropriately responded to, for example, by dynamically deriving additional query graphs and/or dynamically providing search results 712, ending the flow 714.

Figure 8:
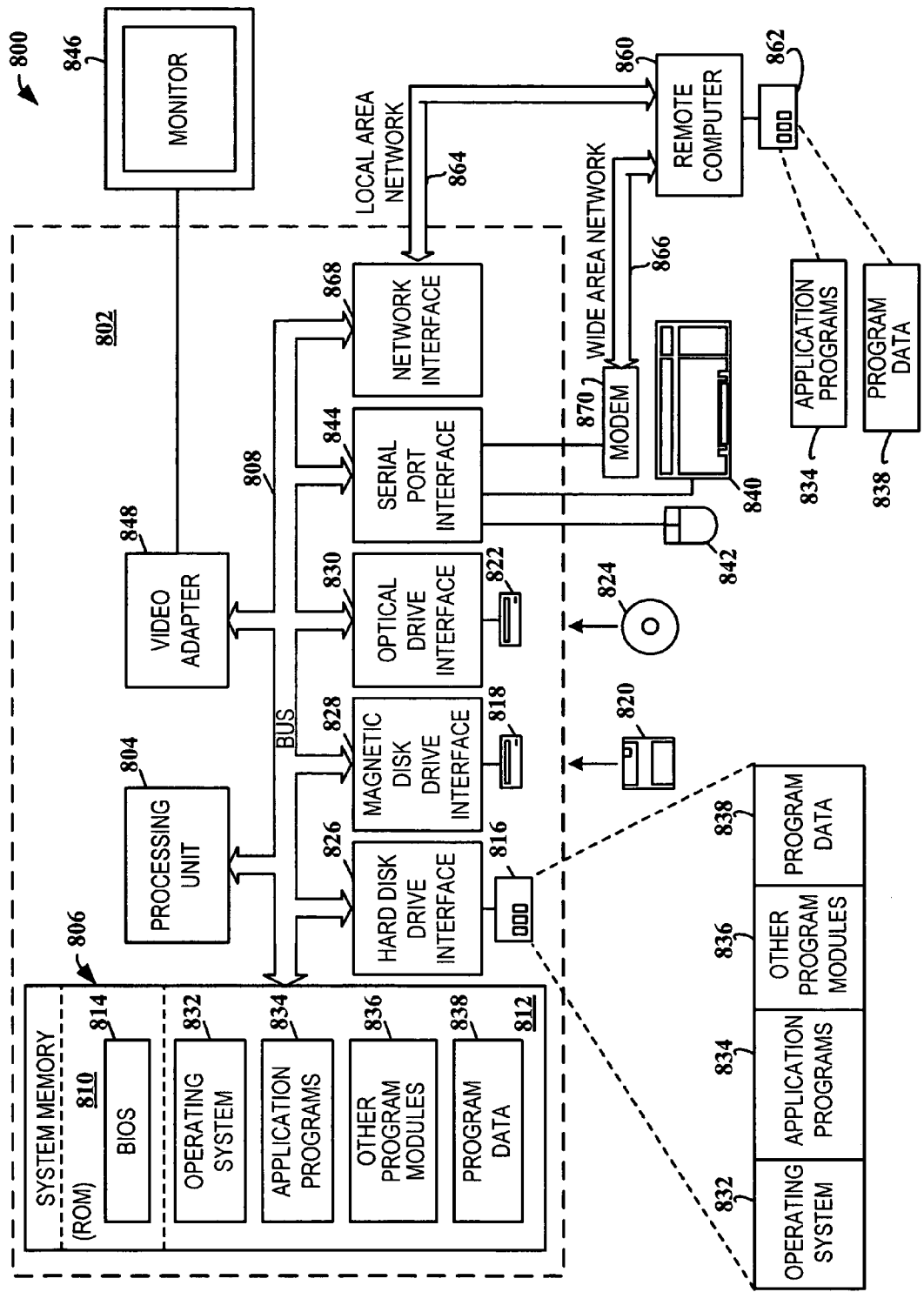
FIG. 8 illustrates an example operating environment in which the present invention can function.

In order to provide additional context for implementing various aspects of the present invention, FIG. 8 and the following discussion is intended to provide a brief, general description of a suitable computing environment 800 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 8, an exemplary system environment 800 for implementing the various aspects of the invention includes a conventional computer 802, including a processing unit 804, a system memory 806, and a system bus 808 that couples various system components, including the system memory, to the processing unit 804. The processing unit 804 may be any commercially available or proprietary processor. In addition, the processing unit may be implemented as multi-processor formed of more than one processor, such as may be connected in parallel.

The system bus 808 may be any of several types of bus structure including a memory bus or memory controller, a peripheral bus, and a local bus using any of a variety of conventional bus architectures such as PCI, VESA, Microchannel, ISA, and EISA, to name a few. The system memory 806 includes read only memory (ROM) 810 and random access memory (RAM) 812. A basic input/output system (BIOS) 814, containing the basic routines that help to transfer information between elements within the computer 802, such as during start-up, is stored in ROM 810.

The computer 802 also may include, for example, a hard disk drive 816, a magnetic disk drive 818, e.g., to read from or write to a removable disk 820, and an optical disk drive 822, e.g., for reading from or writing to a CD-ROM disk 824 or other optical media. The hard disk drive 816, magnetic disk drive 818, and optical disk drive 822 are connected to the system bus 808 by a hard disk drive interface 826, a magnetic disk drive interface 828, and an optical drive interface 830, respectively. The drives 816-822 and their associated computer-readable media provide nonvolatile storage of data, data structures, computer-executable instructions, etc. for the computer 802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 800, and further that any such media may contain computer-executable instructions for performing the methods of the present invention.

A number of program modules may be stored in the drives 816-822 and RAM 812, including an operating system 832, one or more application programs 834, other program modules 836, and program data 838. The operating system 832 may be any suitable operating system or combination of operating systems. By way of example, the application programs 834 and program modules 836 can include an information searching scheme in accordance with an aspect of the present invention.

A user can enter commands and information into the computer 802 through one or more user input devices, such as a keyboard 840 and a pointing device (e.g., a mouse 842). Other input devices (not shown) may include a microphone, a joystick, a game pad, a satellite dish, a wireless remote, a scanner, or the like. These and other input devices are often connected to the processing unit 804 through a serial port interface 844 that is coupled to the system bus 808, but may be connected by other interfaces, such as a parallel port, a game port or a universal serial bus (USB). A monitor 846 or other type of display device is also connected to the system bus 808 via an interface, such as a video adapter 848. In addition to the monitor 846, the computer 802 may include other peripheral output devices (not shown), such as speakers, printers, etc.

It is to be appreciated that the computer 802 can operate in a networked environment using logical connections to one or more remote computers 860. The remote computer 860 may be a workstation, a server computer, a router, a peer device or other common network node, and typically includes many or all of the elements described relative to the computer 802, although for purposes of brevity, only a memory storage device 862 is illustrated in FIG. 8. The logical connections depicted in FIG. 8 can include a local area network (LAN) 864 and a wide area network (WAN) 866. Such networking environments are commonplace in offices, enterprise-wide computer networks, intranets and the Internet.

When used in a LAN networking environment, for example, the computer 802 is connected to the local network 864 through a network interface or adapter 868. When used in a WAN networking environment, the computer 802 typically includes a modem (e.g., telephone, DSL, cable, etc.) 870, or is connected to a communications server on the LAN, or has other means for establishing communications over the WAN 866, such as the Internet. The modem 870, which can be internal or external relative to the computer 802, is connected to the system bus 808 via the serial port interface 844. In a networked environment, program modules (including application programs 834) and/or program data 838 can be stored in the remote memory storage device 862. It will be appreciated that the network connections shown are exemplary and other means (e.g., wired or wireless) of establishing a communications link between the computers 802 and 860 can be used when carrying out an aspect of the present invention.

In accordance with the practices of persons skilled in the art of computer programming, the present invention has been described with reference to acts and symbolic representations of operations that are performed by a computer, such as the computer 802 or remote computer 860, unless otherwise indicated. Such acts and operations are sometimes referred to as being computer-executed. It will be appreciated that the acts and symbolically represented operations include the manipulation by the processing unit 804 of electrical signals representing data bits which causes a resulting transformation or reduction of the electrical signal representation, and the maintenance of data bits at memory locations in the memory system (including the system memory 806, hard drive 816, floppy disks 820, CD-ROM 824, and remote memory 862) to thereby reconfigure or otherwise alter the computer system's operation, as well as other processing of signals. The memory locations where such data bits are maintained are physical locations that have particular electrical, magnetic, or optical properties corresponding to the data bits.

Figure 9:
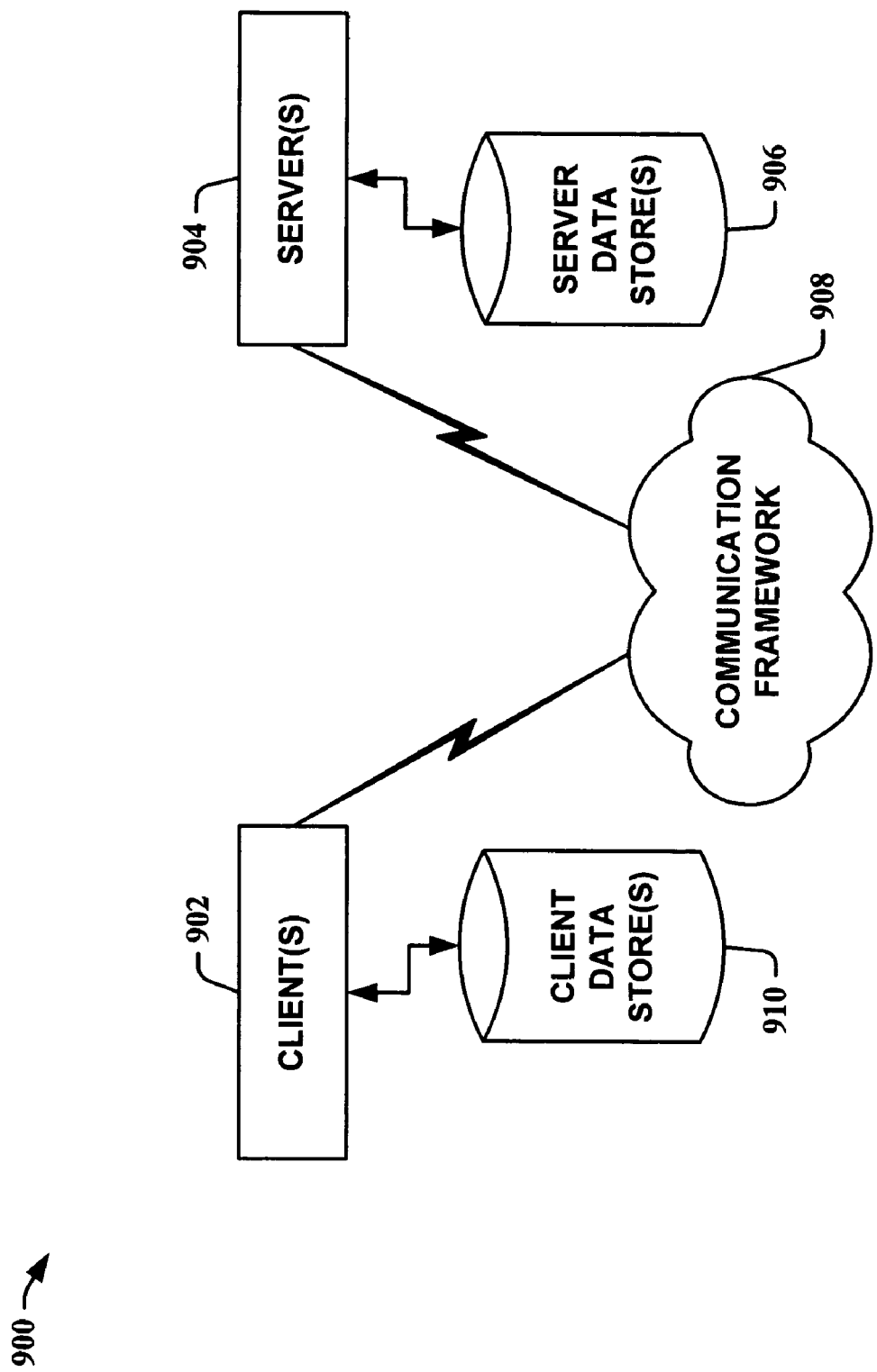
FIG. 9 illustrates another example operating environment in which the present invention can function.

FIG. 9 is another block diagram of a sample computing environment 900 with which the present invention can interact. The system 900 further illustrates a system that includes one or more client(s) 902. The client(s) 902 can be hardware and/or software (e.g., threads, processes, computing devices). The system 900 also includes one or more server(s) 904. The server(s) 904 can also be hardware and/or software (e.g., threads, processes, computing devices). One possible communication between a client 902 and a server 904 may be in the form of a data packet adapted to be transmitted between two or more computer processes. The system 900 includes a communication framework 908 that can be employed to facilitate communications between the client(s) 902 and the server(s) 904. The client(s) 902 are connected to one or more client data store(s) 910 that can be employed to store information local to the client(s) 902. Similarly, the server(s) 904 are connected to one or more server data store(s) 906 that can be employed to store information local to the server(s) 904.

In one instance of the present invention, a data packet transmitted between two or more computer components that facilitates information searching is comprised of, at least in part, information relating to an automatically derived query graph based, at least in part, on results associated with at least one query and/or at least one search intention.

It is to be appreciated that the systems and/or methods of the present invention can be utilized in information search facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates searching, comprising:
a processor;
a memory communicatively coupled to the processor, the memory having stored therein computer-executable instructions configured to implement the searching system including:
an input component that receives at least one search query from the user; and
a search component that obtains results associated with the at least one search query and provides an automatically derived query graph having nodes and edges connecting the nodes, each node of the query graph represents a distinct query, wherein nodes representing queries that are older are depicted further in the background of the query graph than nodes representing more recent queries.

2. The system of claim 1, the query graph comprising a navigable graph.

3. The system of claim 1, the query graph comprising a listing of at least one query.

4. The system of claim 1, the query graph comprising a graph with more than two dimensions.

5. The system of claim 4, one of the dimensions representing time.

6. The system of claim 1, the query graph comprising a graph containing related queries that are organized via at least one of similarity, popularity, novelty, or quality.

7. The system of claim 1, the query graph comprising a graph containing representations of searches that are organized via at least one of similarity, popularity, novelty, or quality.

8. The system of claim 1, the query graph comprising a graph depicting relationships between the at least one query and at least one related query utilized in the query graph.

9. The system of claim 1, the search component provides at least one search result associated with the at least one search query.

10. The system of claim 1, the search component utilizes at least one information source to obtain the results associated with the at least one search query and to provide the automatically derived query graph.

11. The system of claim 10, the information source comprising at least one of a query log, a composed query list, or a search engine.

12. The system of claim 1, the search component employs query session information to facilitate in deriving the query graph.

13. The system of claim 12, the query session information comprising, at least in part, related query similarity information based on at least one of an immediate user query or at least one prior user query.

14. The system of claim 1, the search component utilizes user preferences to facilitate in deriving the query graph, wherein user preferences are utilized to automatically exclude one or more queries from the query graph.

15. The system of claim 14, the user preferences comprising at least one of direct or derived preferences.

16. The system of claim 15, the derived preferences comprising preferences based on information derived from one other user or group of users similar to the user.

17. The system of claim 1 further comprising:
a user interface component that facilitates the user in navigating the query graph derived by the search component.

18. The system of claim 17, the user interface component allows the user to select at least one of one or more queries or one or more search results.

19. The system of claim 17, the search component interacts with the user interface component to provide at least one of a query graph or a query result in response to a user selection within a query graph.

20. The system of claim 19, the user selection comprising a plurality of nodes of a query graph.

21. The system of claim 19, the user selection comprising a selection via at least one of hovering over a query graph node or edge, clicking a pointing device on a query graph node or edge, visually indicating a query graph node or edge, or audibly indicating a query graph node or edge.

22. A computer readable medium having stored thereon computer executable components of the system of claim 1.

23. A device employing the system of claim 1 comprising at least one selected from the group consisting of a computer, a server, or a handheld electronic device.

24. A method for facilitating searching, comprising:
employing a processor executing computer executable instructions stored on a computer readable storage medium to implement the following acts:
receiving at least one search query from a user; and
automatically deriving a query graph from results associated with the at least one search query, wherein a themed overlay is utilized on the graph, the themed overlay is selected based upon a derived user preference, the themed overlay represents the query graph using a graphical representation that employs graphical icons to represent nodes that are appropriate for the user to understand the query graph.

25. The method of claim 24 further comprising:
approximately centering the derived query graph around the at least one search query.

26. The method of claim 24, wherein the themed overlay is at least one of a graphical representation of a house with windows representing nodes or a tree with leaves representing nodes and branches representing edges.

27. The method of claim 24, deriving the query graph comprising:
determining related queries to the received at least one search query; and
organizing the related queries via at least one of similarity, popularity, novelty, or quality to form the query graph.

28. The method of claim 24 further comprising:
providing at least one search result associated with the at least one search query.

29. The method of claim 24 further comprising:
employing query session information to facilitate in deriving the query graph.

30. The method of claim 24 further comprising:
utilizing user preferences to facilitate in deriving the query graph; the user preferences comprising at least one of direct or derived preferences.

31. The method of claim 24 further comprising:
utilizing a location to facilitate in deriving the query graph.

32. The method of claim 24 further comprising:
employing an excluded query to facilitate in deriving the query graph; the excluded query provided by at least one of a system or a user input.

33. The method of claim 24 further comprising:
providing a user interface to facilitate a user in interacting with the query graph.

34. The method of claim 33 further comprising:
conveying a query graph to a user that excludes at least one edge from view.

35. The method of claim 33 further comprising:
conveying a query graph to a user as a listing of at least one query.

36. The method of claim 33 further comprising:
employing at least one of an audible or visual indicator via the user interface to facilitate in conveying information to a user.

37. The method of claim 34, the visual indicator comprising at least one graphical image representing at least one node of the query graph.

38. The method of claim 36, the visual indicator comprising an overlay applied to the query graph.

39. The method of claim 36, the visual indicator comprising clustering of related queries based upon strength of relation between queries.

40. The method of claim 39, the visual indicator comprising at least one of a color indicator, a line thickness indicator, or a dashed line indicator to indicate the strength of relation.

41. The method of claim 33 further comprising:
inputting user selections via the user interface; the user selections comprising at least one of hovering over a query graph node or edge, clicking a pointing device on a query graph node or edge, visually indicating a query graph node or edge, or audibly indicating a query graph node or edge.

42. The method of claim 41 further comprising:
dynamically deriving at least one of a query graph or query result list in response to a user selection.

43. The method of claim 41 further comprising:
providing access to a document or a web page associated with a query in response to a user selection.

44. The method of claim 33 further comprising:
adjusting a number of conveyed queries in response to a user input.

45. A device employing the method of claim 24 comprising at least one selected from the group consisting of a computer, a server, or a handheld electronic device.

46. A system that facilitates searching, comprising:
means for receiving at least one search query from a user; and
means for obtaining results associated with the at least one search query and providing an automatically derived query graph, each node of the query graph represents a distinct query, each edge of the query graph represents a relationship between queries represented by the nodes connected by the edge, wherein the system automatically excludes one or more queries from a display of the query graph based upon environmental factors associated with the user at the time the user submitted the query; means for displaying the query graph.

* * * * *